O. F. HEER.
CULTIVATOR ATTACHMENT FOR TRACTORS.
APPLICATION FILED JUNE 20, 1921.

1,429,875.

Patented Sept. 19, 1922
2 SHEETS—SHEET 1.

INVENTOR
OTTO F. HEER
Hazard & Miller
ATT'YS.

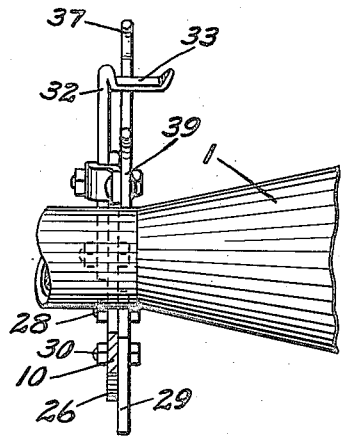
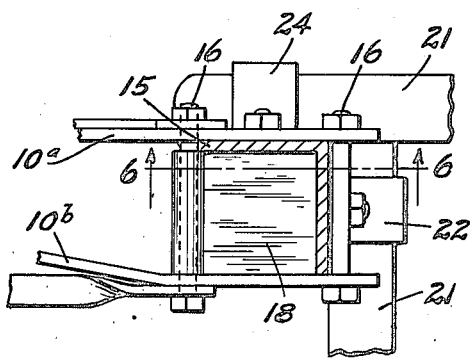
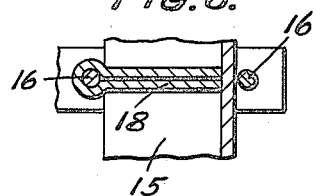
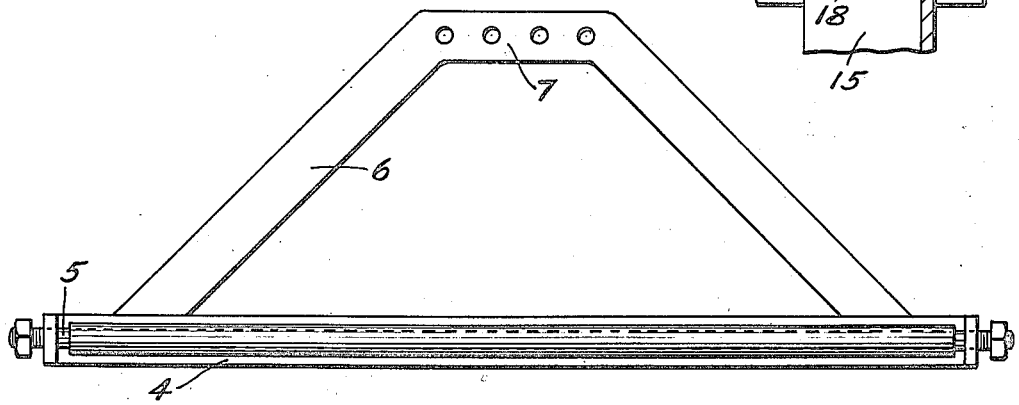
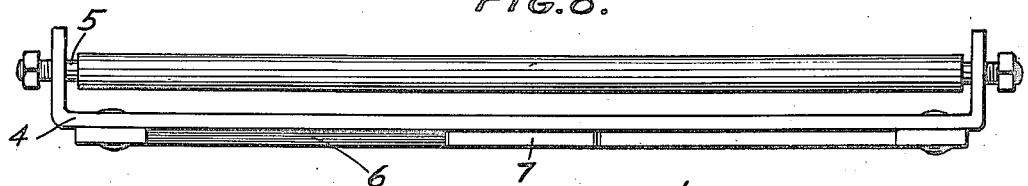

Patented Sept. 19, 1922.

1,429,875

UNITED STATES PATENT OFFICE.

OTTO F. HEER, OF NAROD, CALIFORNIA.

CULTIVATOR ATTACHMENT FOR TRACTORS.

Application filed June 20, 1921. Serial No. 478,989.

*To all whom it may concern:*

Be it known that I, OTTO F. HEER, a citizen of the United States, residing at Narod, in the county of San Bernardino and State of California, have invented new and useful Improvements in Cultivator Attachments for Tractors, of which the following is a specification.

This invention relates to earth working implements formed as attachments to be connected to usual tractors.

The invention consists essentially of a draft frame fixed to the rear of the tractor, and a rock frame pivoted upon said draft frame and having earth engaging elements at one end, and means at its other end arranged to be engaged by the axle housing of the tractor for limiting the movement of the earth engaging elements into the ground. A locking means is also provided upon the rock frame and is arranged to engage the axle housing of the tractor when the rock frame is swung to cause disengagement of the earth working elements.

The invention will be readily understood from the following description of the accompanying drawings, in which:

Fig. 4 is a detail section on the line 4—4 of Fig. 2.

Fig. 5 is a detail section on the line 5—5 of Fig. 1.

Fig. 6 is a detail section on the line 6—6 of Fig. 5.

Fig. 7 is a plan view of the draft frame of the attachment.

Fig. 8 is a rear elevation of the draft frame.

Figure 1:
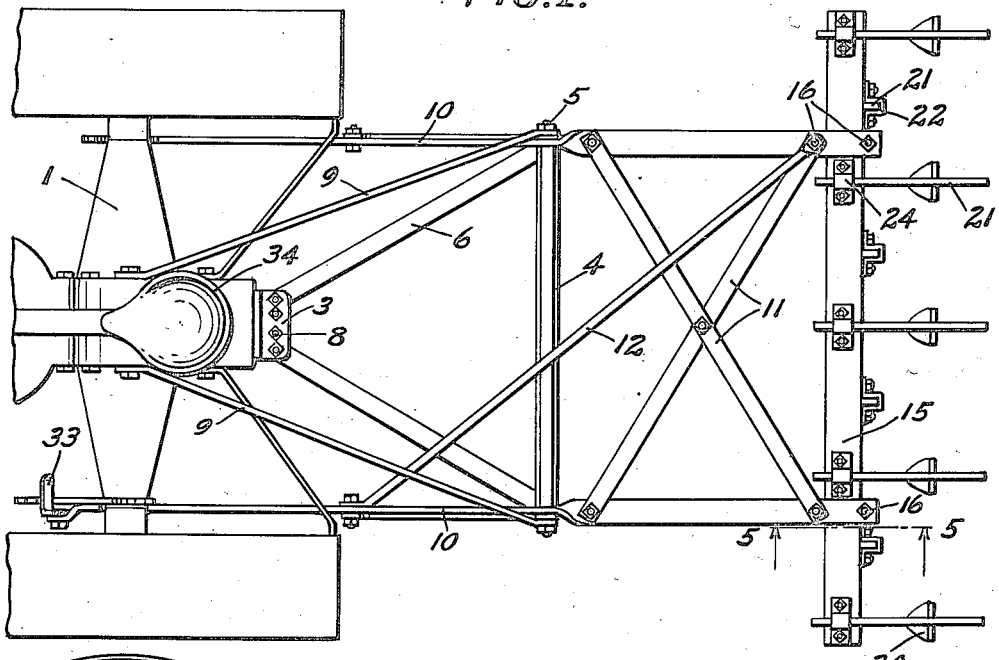
Figure 1 is a plan view of a device constructed in accordance with the invention.

The attachment is employed in connection with a usual tractor including rear axle housing 1 and rear wheels 2. A usual connecting plate 3 for a draft mechanism is provided at the rear of the tractor.

The attachment includes a draft frame comprising a transverse bar 4 having the pivotal rod 5 mounted thereon. A frame 6 extends forwardly from the bar 4 and terminates in a connecting plate 7 adapted to be received upon plate 3 and rigidly fixed thereto as by bolts 8. Braces 9 preferably extend forwardly and upwardly from bar 4 and are connected to the upper portion of axle housing 1.

A rock frame is fulcrumed upon pivot rod 5 and includes side bars 10 transversely braced in rear of the fulcrum of the frame as shown at 11 and also braced as shown at 12 from one side of the frame in rear of its fulcrum to the opposite side of said frame in front of the fulcrum. The operating means for swinging the rock frame upon its fulcrum is arranged at one side of the same, and the brace 12 extends forwardly to said side of the frame in order to form an adequate brace when pressure is exerted upon the frame for locking the same.

Earth engaging elements are carried at the rear of the rock frame preferably upon angle iron 15 extending transversely of said rock frame and fixed to side bars 10. The rear ends of side bars 10 are preferably forked to form extensions 10ª and 10ᵇ which are received against the upper and lower edges of angle iron 15, and bolts 16 connect these forked extensions at the angle iron. Bracing members are arranged in the angle of the angle iron at respective side bars 10, and said bracing members are shown as plates 18 reversely bent upon themselves and received in the angle of iron 15 with certain of the bolts 16 extending through the loops formed by said bracing plates for retaining the latter in position.

In the present instance the earth engaging elements carried by iron 15 are shown as cultivators 20 fixed upon shanks 21, and said elements are preferably connected to the iron 15 with certain of the shanks 21 extending vertically and received against one web of the iron as in brackets 22 and with certain others of the shanks 21 curved over the horizontal web of the angle iron and hooked thereto as shown at 23. Brackets 24 are also employed for fixing said shanks to the angle iron.

The means for swinging the rock frame to move the earth engaging elements into either operative or inoperative position, preferably includes curved extensions 26 formed at the forward ends of side bars 10 and positioned beneath the axle housing 1. Abutment bars 27 extend across the curved extensions 26 and are pivotally mounted thereon at one end, as shown at 28, while the opposite ends of the abutment elements form lateral extensions 29 adapted to be adjustably connected to the curved extensions 26 as by bolts 30 received through any one of a series of bolt holes 31 along the lateral extensions. By this arrangement it will be seen that the abutment members 27 may be raised and lowered with respect to the side bars 10, and said abutment elements are adapted to engage beneath the axle housing 1 when the rock frame is swung so as to cause engagement of the earth working elements with the ground. The adjustment of abutment members 27 will thus regulate the depth of the engagement of the earth working elements.

The weight of the rock frame will normally tend to swing the same into operative position, and in order to swing said frame in the opposite direction so as to disengage the earth working elements, the side bar 10 which carries the operating means for the frame is provided with an extension 32 beyond the curved extension 26 and terminating in a pedal 33. The operator upon seat 34 of the tractor may thus swing the rock frame to inoperative position by depressing pedal 33.

In order to lock the rock frame in inoperative position, a shank 36 is journaled upon the extension 32, and at its outer end forms a contact 37 adapted to be impinged by the heel of the operator. The opposite end of shank 36 forms a curved contact surface 39 which co-operates with axle housing 1.

Figure 2:
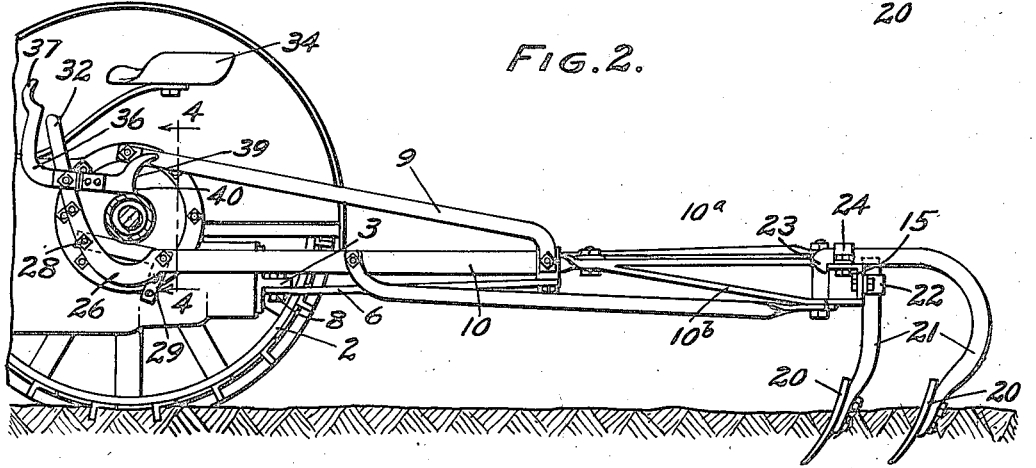
Fig. 2 is a side elevation of the same showing the earth engaging elements in operative position.
Figure 3:
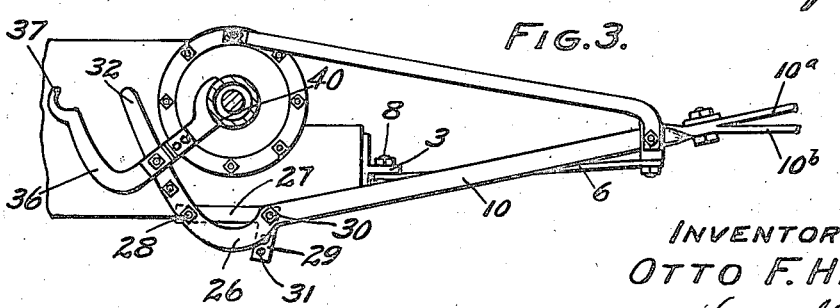
Fig. 3 is a fragmentary side elevation of the invention showing the same moved to inoperative position.

When the rock frame is in operative position, the contact surface 39 of the locking shank is above the axle housing, as clearly shown in Fig. 2, but as pedal 33 is depressed the swing of the rock frame will carry the locking shank to the position shown in Fig. 3 wherein curved surface 39 engages beneath the axle housing 1 and binds against the same so as to prevent subsequent return of the rock frame to operative position when the pressure against pedal 33 is released. The locking shank may, however, be readily released by the operator pressing against contact member 37 in order to force the shoulder 40 at the end of contact surface 39 past the axle housing. When the locking shank has thus been released, the parts will return to the position shown in Fig. 2.

Various changes may be made without departing from the spirit of the invention as claimed.

What is claimed is:

1. The combination with a tractor having a seat above the rear axle housing and a connecting plate directly below the seat, of a transverse bar, a frame extending forwardly from the bar a considerable distance and rigidly secured to the connecting plate, braces extending forwardly and upwardly from the transverse bar and rigidly connected to the axle housing, a rock frame pivotally connected to the transverse bar and having side bars extending forwardly and backwardly, the forward ends of the side bars extending under the axle housing, the rear ends of the side bars being adapted to carry a cultivator or the like, means for adjusting the contacts between the forward ends of the side bars and the axle housing to limit the downward swing of the cultivator, an arm extending upwardly and forwardly from one side bar in front of the axle housing, and a latch pivotally connected to the arm and adapted to engage the axle housing, so that when the arm is forced forwardly the cultivator is raised and the latch holds the cultivator in its elevated position.

2. The combination with a tractor having a seat above the rear axle housing and a connecting plate directly below the seat, of a transverse bar, a frame extending forwardly from the bar a considerable distance and rigidly secured to the connecting plate, braces extending forwardly and upwardly from the transverse bar and rigidly connected to the axle housing, a rock frame pivotally connected to the transverse bar and having side bars extending forwardly and backwardly, the forward ends of the side bars extending under the axle housing, the rear ends of the side bars being adapted to carry a cultivator or the like, there being a downwardly extending curve at the forward ends of the side bars to form a clearance for the axle housing, abutment bars pivoted to the side bars and extending across the clearances, means for adjusting the abutment bars to adjust the depth to which the cultivator will work, an arm extending forwardly and upwardly from one side bar in front of the axle housing and adapted to be manually operated to raise the cultivator, and means for holding the cultivator raised.

3. The combination with a tractor having rear wheels, a rear axle housing, and a seat above the rear axle housing and a connecting plate below the seat, of a rigid frame extending backwardly from the connecting plate, a second frame pivotally mounted on the rigid frame and having side bars adapted to extend backwardly and carry a cultivator and extend forwardly under the axle housing, an arm extending forwardly and upwardly from one of the side bars in front of the axle housing and adapted to be pressed forwardly and downwardly to raise the cultivator, and a shank pivoted upon the arm, one end of the shank serving as a handle and the other end of the shank being adapted to engage the axle housing and hold the cultivator elevated.

In testimony whereof I have signed my name to this specification.

OTTO F. HEER.